US006807038B2

(12) United States Patent
Iwagami et al.

(10) Patent No.: US 6,807,038 B2
(45) Date of Patent: Oct. 19, 2004

(54) SEMICONDUCTOR DEVICE (75) Inventors: Toru Iwagami, Tokyo (JP); Hiroshi Sakata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 536 days.

(21) Appl. No.: 09/902,777

(22) Filed: Jul. 12, 2001

(65) Prior Publication Data
US 2002/0114115 A1 Aug. 22, 2002

(30) Foreign Application Priority Data

Feb. 19, 2001 (JP) ........................................ 2001-041989

(51) Int. Cl.[7] ............................. H02H 3/08; H02H 9/02
(52) U.S. Cl. ..................................................... 361/93.1
(58) Field of Search ............................. 361/93.1, 93.7; 363/98, 132

(56) References Cited

U.S. PATENT DOCUMENTS

| 3,427,526 | A | * | 2/1969 | Kernick | 363/49 |
| 4,099,225 | A | * | 7/1978 | Nygaard | 363/56.03 |
| 4,291,265 | A |   | 9/1981 | Kawada et al. | |
| 4,816,985 | A | * | 3/1989 | Tanahashi | 363/81 |
| 5,218,283 | A | * | 6/1993 | Wills et al. | 318/748 |
| 5,615,102 | A | * | 3/1997 | Daijo | 363/132 |
| 5,719,519 | A |   | 2/1998 | Berringer | |
| 6,590,794 | B1 | * | 7/2003 | Carter | 363/98 |

FOREIGN PATENT DOCUMENTS

EP     1 056 205     11/2000

* cited by examiner

*Primary Examiner*—Brian Sircus
*Assistant Examiner*—Z Kitov
(74) *Attorney, Agent, or Firm*—Oblon, Spivak, McClelland, Maier & Neustadt, P.C.

(57) ABSTRACT

A comparator compares the voltage of a shunt resistor, detected by a current detection terminal, with a reference voltage and supplies a current abnormality signal to a fault circuit when the voltage of the shunt resistor is in excess of the reference voltage. A stop signal is then supplied to a power device driving circuit and an input circuit. In response to the received stop signal, the power device driving circuit and another power device driving circuit stop operation of transistors respectively. The fault circuit, which is capable of outputting the stop signal through a fault terminal, is also able to receive a stop signal output from another control circuit and supply the stop signal to the power device driving circuit and the input circuit. Thus, the circuitry of an inverter module having a protective function is simplified, and the module is able to be miniaturized.

9 Claims, 8 Drawing Sheets

SEMICONDUCTOR DEVICE

BACKGROUND OF THE INVENTION

1. Field of the Invention

The present invention relates to a semiconductor device, and more particularly, it relates to a power semiconductor device having a protective function.

2. Description of the Background Art

Figure 8:
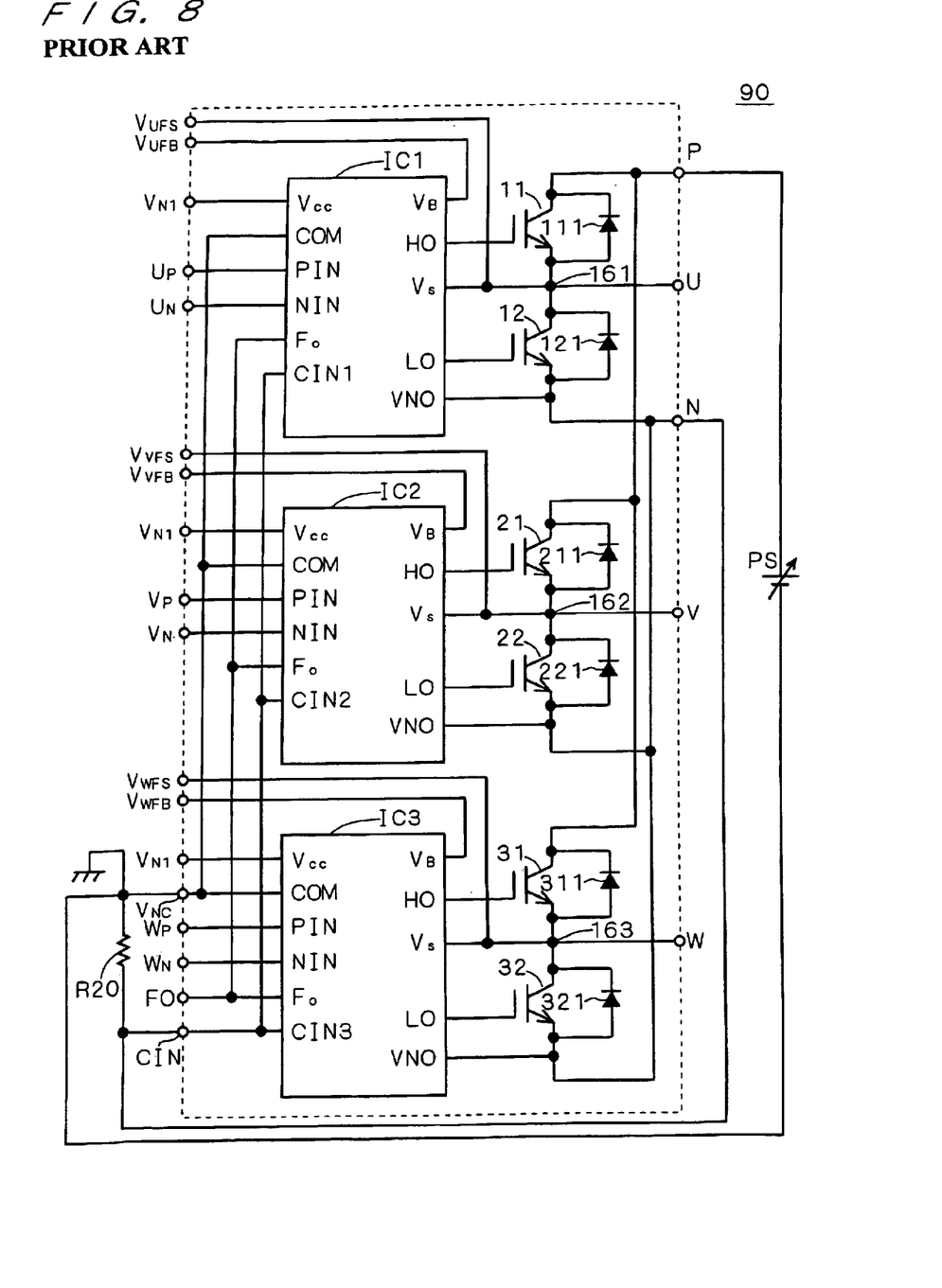
FIGS. 8 and 9 illustrate the structure of a conventional semiconductor device.

FIG. 8 is a block diagram showing the structure of an inverter module 90 having a three-phase bridge circuit. As shown in FIG. 8, sets of transistors 11 and 12, transistors 21 and 22 and transistors 31 and 32 which are power devices such as IGBTs (insulated gate bipolar transistors) are totem-pole connected between terminals P and N, i.e. a high-potential side main power supply terminal P and a low-potential side main power supply terminal N. The main power supply terminals P and N are connected to positive and negative electrodes of a dc power source PS respectively.

Nodes 161, 162 and 163 between the totem-pole connected transistors 11 and 12, 21 and 22 and 31 and 32 are connected to output terminals U, V and W of U-, V- and W-phases respectively.

Freewheel diodes 111, 121, 211, 221, 311 and 321 are connected in antiparallel with the transistors 11, 12, 21, 22, 31 and 32 respectively.

Packaged control circuits IC1, IC2 and IC3 are arranged for controlling the sets of the transistors 11 and 12, 21 and 22 and 31 and 32 respectively. The control circuits IC1 to IC3, which are functionally identical to each other, are shown with different reference numerals for the purpose of convenience.

Control signal output terminals HO and NO of the control circuit IC1 supply control signals to gate electrodes of the transistors 11 and 12 respectively, control signal output terminals HO and LO of the control circuit IC2 supply control signals to gate electrodes of the transistors 21 and 22 respectively, and control signal output terminals HO and LO of the control circuit IC3 supply control signals to gate electrodes of the transistors 31 and 32 respectively.

Standard potential terminals $V_S$ of the control circuits IC1 to IC3 are connected to the nodes 161, 162 and 163 respectively as well as to standard potential terminals $V_{UFS}$, $V_{VFS}$ and $V_{WFS}$ of the packages respectively.

Further, standard potential terminals VNO of the control circuits IC1 to IC3 are connected to the low-potential side main power supply terminal N in common, while driving voltage terminals $V_B$ of the control circuits IC1 to IC3 are connected to driving voltage terminals $V_{UFB}$, $V_{VFB}$ and $V_{WFB}$ of the packages respectively.

Each standard potential terminal $V_S$ supplies a high-potential side reference potential to each control circuit, and each standard potential terminal VNO supplies a low-potential side reference potential to each control circuit.

The control circuits IC1 to IC3 have driving voltage terminals $V_{CC}$, ground terminals COM, control signal input terminals PIN and NIN and fault terminals $F_O$. The control circuits IC1 to IC3 further have current detection terminals CIN1, CIN2 and CIN3 respectively. The current detection terminals CIN1 to CIN3 are functionally identical to each other.

The driving voltage terminals $V_{CC}$ of the control circuits IC1 to IC3 are connected to driving voltage terminals $V_{NI}$ of the module 90, while the ground terminals COM are connected to a ground terminal $V_{NC}$ of the module 90.

The control signal input terminals PIN of the control circuits IC1 to IC3 are connected to control signal input terminals $U_P$, $V_P$ and $W_P$ of the module 90 respectively, while the control signal input terminals NIN are connected to control signal input terminals $U_N$, $V_N$ and $W_N$ of the module 90 respectively.

The fault terminals $F_O$ of the control circuits IC1 to IC3 are connected with each other in the module 90, and connected to a fault terminal FO of the module 90 in common.

The current detection terminal CIN3 of the control circuit IC3 is connected to a current detection circuit CIN of the module 90, and connected to the current detection terminals CIN1 and CIN2 in the module 90.

The ground terminal $V_{NC}$ and the current detection terminal CIN of the module 90 are connected to both ends of a shunt resistor R20 detecting a direct current flowing across the main power supply terminals P and N in the exterior of the module 90, for detecting the voltage of the shunt resistor R20.

The structure for detecting the voltage with the current detection terminals CIN1 to CIN3 is now described with reference to FIG. 9. While FIG. 9 illustrates the current detection terminal CIN1, this structure also applies to the current detection terminals CIN2 and CIN3.

Figure 9:
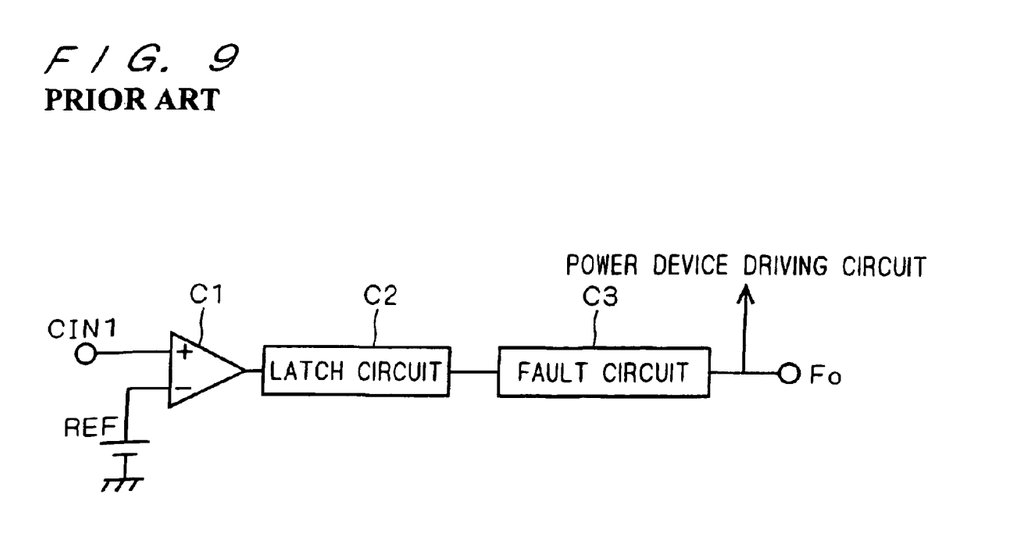

Referring to FIG. 9, the voltage of the shunt resistor R20 detected by the current detection terminal CIN1 is input in a comparator C, which in turn compares this voltage with a reference voltage REF. If the voltage of the shunt resistor R20 is in excess of the reference voltage REF, the voltage is supplied through a latch circuit C2 to a fault circuit C3, which in turn supplies an instruction for stopping operation of the transistors 11 and 12 to a power device driving circuit (not shown) provided in the control circuit IC1. The fault terminal $F_O$ outputs the aforementioned instruction.

The inverter module 90 having the aforementioned structure performs dc-ac conversion by alternately driving the transistors 11, 12, 21, 22, 31 and 32 for supplying ac power to a load (not shown).

When an abnormal current flows across the terminals P and N due to abnormal operation of the transistors 11, 12, 21, 22, 31 and 32 or the like in the inverter module 90, the shunt resistor R20 exhibits an abnormal voltage. The current detection terminals CIN1, CIN2 and CIN3 of the control circuits IC1 to IC3 detect this abnormal voltage and the control circuits IC1 to IC3 stop the control signals to the transistors 11, 12, 21, 22, 31 and 32 respectively, thereby protecting the transistors 11, 12, 21, 22, 31 and 32.

Thus, the module 90 requires wires (internal wires) therein for supplying the voltage of the shunt resistor R20 to all control circuits IC1 to IC3. Consequently, the internal wires are so disadvantageously complicated that the module 90 cannot be miniaturized.

SUMMARY OF THE INVENTION

According to a first aspect of the present invention, a semiconductor device comprises at least one set of complementarily operating first and second switching elements serially interposed between first and second main power supply terminals supplied with a dc voltage, at least one control circuit driving/controlling the set of first and second switching elements and a shunt resistor detecting a current flowing across the first and second main power supply terminals, while the control circuit comprises at least one current detection circuit detecting a voltage generated by a current flowing to the shunt resistor and outputting a current abnormality signal indicating current abnormality when the detected voltage is in excess of a prescribed level and a fault circuit receiving the current abnormality signal output from the current detection circuit and outputting a stop signal for stopping operation of at least one of the first and second switching elements, and the fault circuit has a function of outputting the stop signal to the exterior of the control circuit while stopping operation of at least one of the first and second switching elements also by a signal, identical to the stop signal, input from the exterior of the control circuit.

In the semiconductor device according to the first aspect, the fault circuit has the function of outputting the stop signal to the exterior of at least one control circuit and receiving the signal identical to the stop signal input from the exterior of at least one control circuit for stopping the operation of at least one of the first and second switching elements. Therefore, when at least one set of first and second switching elements are shorted to cause current abnormality across the first and terminals, for example, remaining switching elements, for example, can be stopped at timing for stopping at least one set of first and second switching elements by at least one control circuit, thereby matching the timing for stopping the switching elements.

According to a second aspect of the present invention, the control circuit further comprises a voltage detection circuit detecting a driving voltage supplied to the control circuit and outputting a voltage reduction signal indicating voltage reduction when the driving voltage is below a prescribed level, and the fault circuit outputs the stop signal when at least one of the voltage reduction signal and the current abnormality signal is output.

In the semiconductor device according to the second aspect, the fault circuit outputs the stop signal when at least either the voltage reduction signal or the current abnormality signal is output, whereby the operation of at least one of the first and second switching elements can be stopped not only in current abnormality across the first and second terminals but also in reduction of the driving voltage.

According to a third aspect of the present invention, the driving voltage is supplied to a control electrode of a low-potential side one of the first and second switching elements also as a control voltage.

In the semiconductor device according to the third aspect, reduction of the driving voltage supplied to the control electrode of the low-potential side one of at least one set of first and second switching elements also as a control voltage is so detected that no level shifting or the like is required but the semiconductor device is easy to handle.

According to a fourth aspect of the present invention, the current detection circuit includes first and second current detection circuits, and the first current detection circuit is set higher in detection sensitivity than the second current detection circuit.

In the semiconductor device according to the fourth aspect, the first current detection circuit is set higher in detection sensitivity than the second current detection circuit, whereby the first and second current detection circuits can be so selectively used that a control circuit for preferentially detecting the voltage of the shunt resistor can be set when a plurality of control circuits are present, for example, and the switching element(s) controlled by the remaining control circuit(s) can be stop-controlled by the stop signal output from a single control circuit.

According to a fifth aspect of the present invention, the semiconductor device comprises a plurality of control circuits and comprises a plurality of sets of first and second switching elements in correspondence to the plurality of control circuits respectively, while only one of the plurality of control circuits detects the voltage of the shunt resistor, outputs the stop signal and supplies the same to the fault circuit of the remaining control circuit.

In the semiconductor device according to the fifth aspect, only one of the plurality of control circuits outputs the stop signal by detecting the voltage of the shunt resistor and supplies the same to the fault circuit(s) of the remaining control circuit(s), whereby the switching element(s) controlled by the remaining control circuit(s) can be stop-controlled by the stop signal output from a single control circuit while only wires for electrically connecting the fault circuits of the plurality of control circuits with each other are required and hence the semiconductor device can be miniaturized by reducing the number of the wires.

According to a sixth aspect of the present invention, the semiconductor device comprises a plurality of control circuits and comprises a plurality of sets of first and second switching elements in correspondence to the plurality of control circuits respectively, while only one of the plurality of control circuits detects the voltage of the shunt resistor by the first current detection circuit while the remaining control circuit is electrically connected to the shunt resistor to detect the voltage of the shunt resistor by the second current detection circuit.

In the semiconductor device according to the sixth aspect, only one of the plurality of control circuits detects the voltage of the shunt resistor by the first current detection circuit while the remaining control circuit detects the voltage of the shunt resistor by the second current detection circuit, whereby a control circuit preferentially detecting the voltage of the shunt resistor can be set and the timing for stopping the switching elements can be matched by stop-controlling the switching element(s) controlled by the remaining control circuit(s) with the stop signal output from a single control circuit.

An object of the present invention is to simplify internal wires in an inverter module having a function of protecting a power device for miniaturizing the module.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

<A. Embodiment 1>

<A-1. Device Structure>

Figure 1:
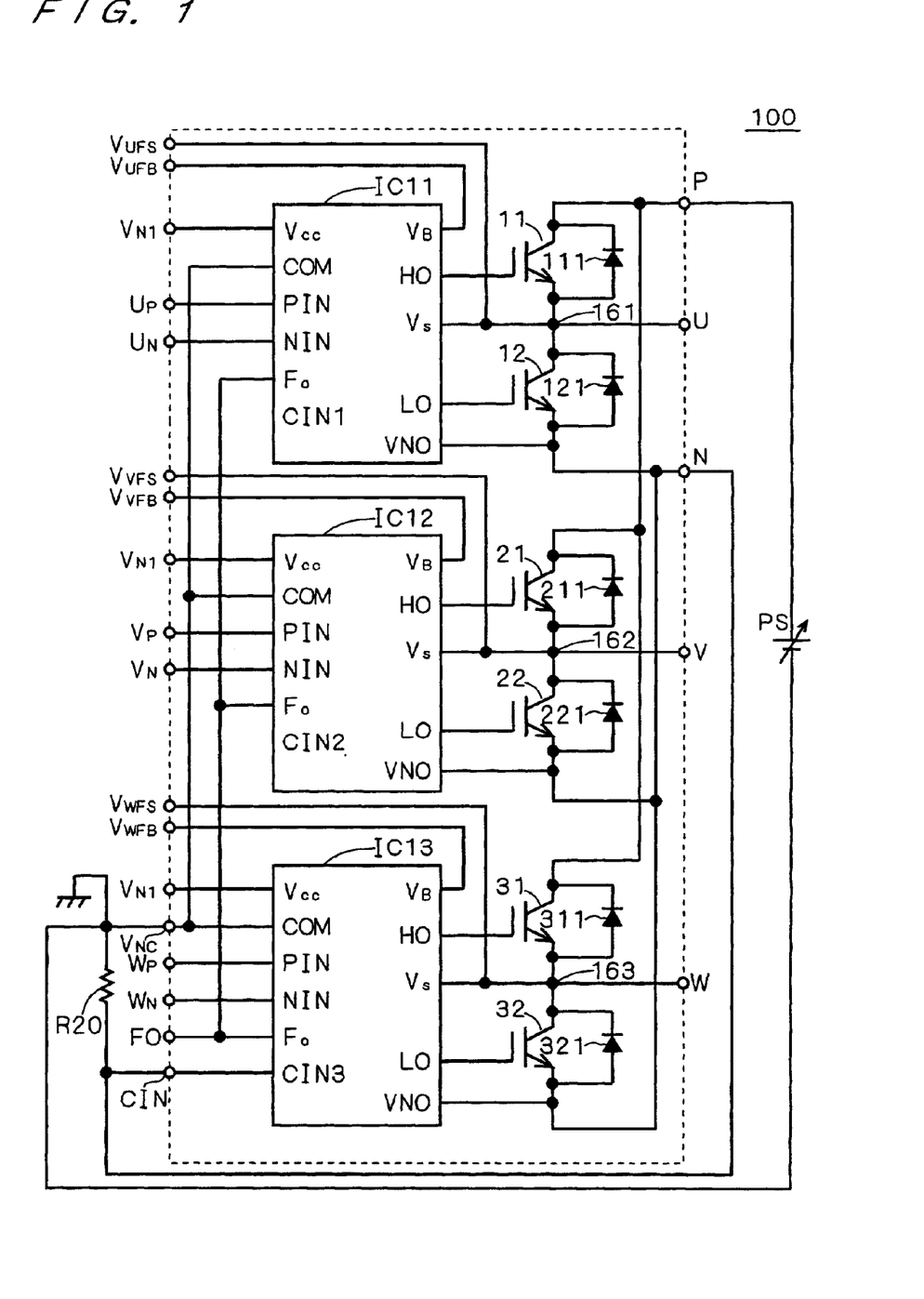
FIG. 1 illustrates the structure of a semiconductor device according to an embodiment 1 of the present invention.

FIG. 1 is a block diagram showing the structure of an inverter module 100 having a three-phase bridge circuit according to an embodiment 1 of the present invention. As shown in FIG. 1, sets of transistors 11 and 12, transistors 21 and 22 and transistors 31 and 32 which are power devices such as IGBTs (insulated gate bipolar transistors) are totem-pole connected between terminals P and N, i.e. a high-potential side main power supply terminal P and a low-potential side main power supply terminal N. The main power supply terminals P and N are connected to positive and negative electrodes of a dc power source PS respectively.

Nodes 161, 162 and 163 between the totem-pole connected transistors 11 and 12, 21 and 22 and 31 and 32 are connected to output terminals U, V and W of U-, V- and W-phases respectively.

Freewheel diodes 111, 121, 211, 221, 311 and 321 are connected in antiparallel with the transistors 11, 12, 21, 22, 31 and 32 respectively.

Packaged control circuits IC11, IC12 and IC13 are arranged for controlling the sets of the transistors 11 and 12, 21 and 22 and 31 and 32 respectively. The control circuits IC11 to IC13 are functionally identical to each other.

Control signal output terminals HO and NO of the control circuit IC11 supply control signals to gate electrodes of the transistors 11 and 12 respectively, control signal output terminals HO and LO of the control circuit IC12 supply control signals to gate electrodes of the transistors 21 and 22 respectively, and control signal output terminals HO and LO of the control circuit IC13 supply control signals to gate electrodes of the transistors 31 and 32 respectively.

Standard potential terminals $V_S$ of the control circuits IC11 to IC13 are connected to the nodes 161, 162 and 163 respectively as well as to standard potential terminals $V_{UFS}$, $V_{VFS}$ and $V_{WFS}$ of the packages respectively.

Further, standard potential terminals VNO of the control circuits IC11 to IC13 are connected to the low-potential side main power supply terminal N in common, while driving voltage terminals $V_B$ of the control circuits IC11 to IC13 are connected to driving voltage terminals $V_{UFB}$, $V_{VFB}$ and $V_{WFB}$ respectively.

Each standard potential terminal $V_S$ supplies a high-potential side reference potential to each control circuit, and each standard potential terminal VNO supplies a low-potential side reference potential to each control circuit.

The control circuits IC11 to IC13 have driving voltage terminals $V_{CC}$, ground terminals COM, control signal input terminals PIN and NIN and fault terminals $F_O$. The control circuits IC11 to IC13 further have current detection terminals CIN1, CIN2 and CIN3 respectively. The current detection terminals CIN1 to CIN3, which are functionally identical to each other, are shown with different reference numerals for the purpose of convenience.

The driving voltage terminals $V_{CC}$ of the control circuits IC11 to IC13 are connected to driving voltage terminals $V_{NI}$ of the module 100, while the ground terminals COM are connected to a ground terminal $V_{NC}$ of the module 100.

The control signal input terminals PIN of the control circuits IC11 to IC13 are connected to control signal input terminals $U_P$, $V_P$ and $W_P$ of the module 100 respectively, while the control signal input terminals NIN are connected to control signal input terminals $U_N$, $V_N$ and $W_N$ of the module 100 respectively.

The fault terminals $F_O$ of the control circuits IC11 to IC13 are connected with each other in the module 100, and connected to a fault terminal FO of the module 100 in common.

While the current detection terminal CIN3 of the control circuit IC13 is connected to a current detection terminal CIN of the module 100, the current detection terminals CIN1 and CIN2 are connected to no terminals.

The ground terminal $V_{NC}$ and the current detection terminal CIN of the module 100 are connected to both ends of a shunt resistor R20 detecting a direct current flowing across the main power supply terminals P and N in the exterior of the module 100, for detecting the voltage of the shunt resistor R20.

Figure 2:
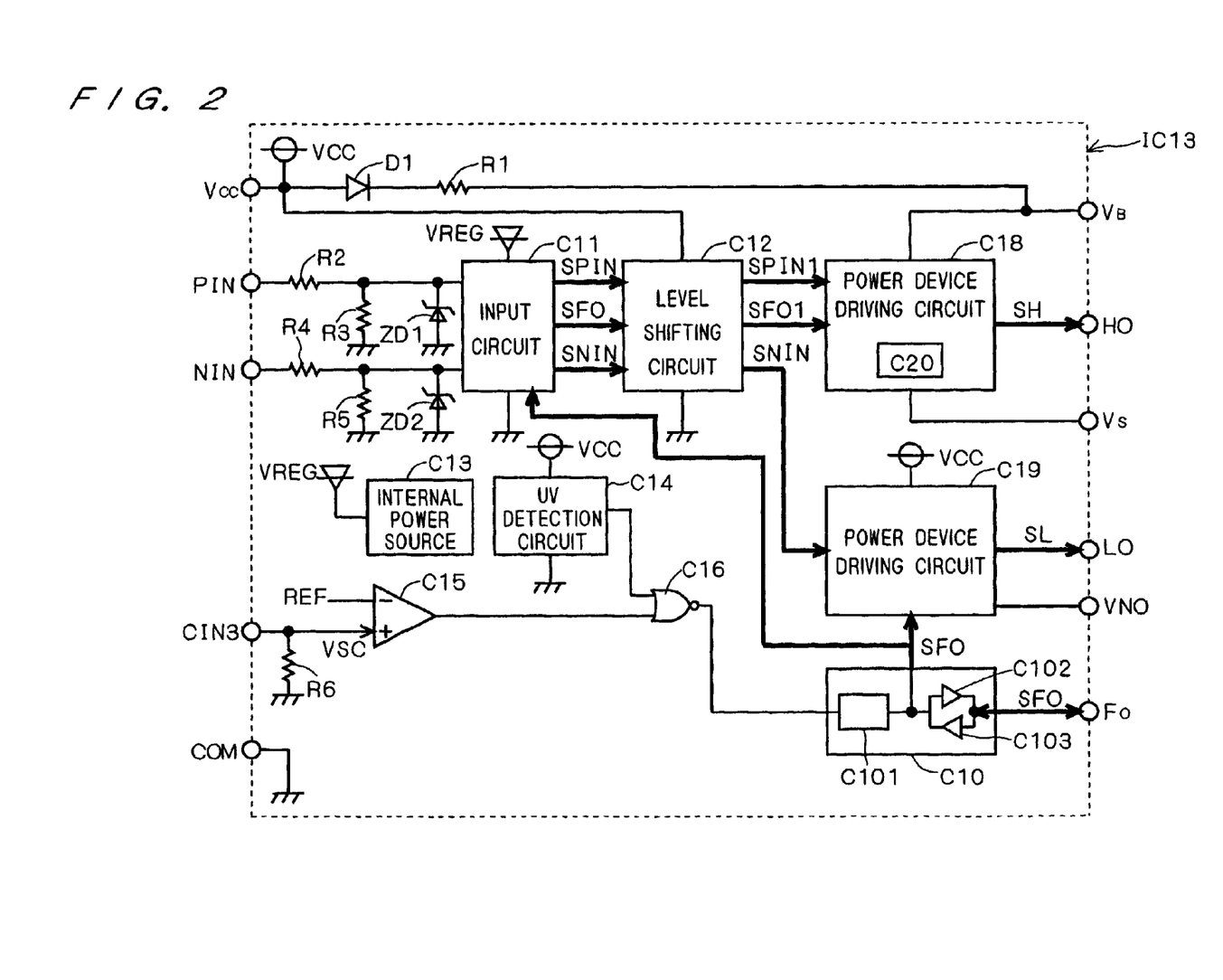
FIG. 2 illustrates the structure of a control circuit of the semiconductor device according to the embodiment 1 of the present invention.

Referring to FIG. 2, the internal structure of each of the control circuits IC11 to IC13 is described with reference to the control circuit IC13.

As shown in FIG. 2, the control circuit IC13 has power device driving circuits C18 and C19 for driving/controlling the transistors 31 and 32. Control signals SH and SL output from the power device driving circuits C18 and C19 respectively are supplied to the gate electrodes of the transistors 31 and 32 (see FIG. 1) through the control signal terminals HO and LO.

The standard potential terminal $V_S$ supplies a standard potential of the high-potential side power device driving circuit C18. Therefore, a signal supplied from an input circuit C11 with reference to a ground potential is supplied to the power device driving circuit C18 through a level shifting circuit C12.

The standard potential terminal VNO supplies a standard potential of the low-potential side power device driving circuit C19.

The input circuit C11 operates with an internal voltage VREG generated by an internal power source C13 for receiving control signals from the control signal input terminals PIN and NIN, voltage-converting the same and supplying the voltage-converted control signals to the level shifting circuit C12.

A resistor R2 is interposed in a wire connecting the control signal input terminal PIN and the input circuit C11 with each other, while a resistor R3 and a Zener diode ZD1 are arranged in parallel between this wire and the ground potential. Similarly, a resistor R4 is interposed in a wire connecting the control signal input terminal NIN and the input circuit C11, while a resistor R5 and a Zener diode ZD2 are arranged in parallel between this wire and the ground potential.

The level shifting circuit C12 shifts the level of a supplied signal such as a control signal SPIN (control signal for the high-potential side transistor) supplied from the control signal input terminal PIN through the input circuit C11, for example, and outputs the level-shifted signal to the power device driving circuit C18 as a control signal SPIN1, while outputting a signal SNIN (control signal for the low-potential side transistor) supplied from the control signal input terminal NIN through the input circuit C11 to the power device driving circuit C19 without level-shifting the same.

The level shifting circuit C12 and the power device driving circuit C19 operate with a driving voltage VCC supplied from the driving voltage terminal $V_{CC}$. The power device driving circuit C18 operates with a driving voltage VB supplied from the driving voltage terminal $V_B$ and the driving voltage VCC, which is supplied to the power device driving circuit C18 through a high withstand voltage diode D1 and the resistor R1.

The structure for voltage detection by the current detection circuit CIN3 is now described. The voltage VSC of the shunt resistor R20 detected by the current detection terminal CIN3 is input in a comparator C15, which in turn compares the voltage with a reference voltage REF. If the voltage VSC of the shunt resistor R20 (FIG. 1) is in excess of the reference voltage REF, the comparator C15 supplies a prescribed signal (current abnormality signal) to a fault circuit C10, which in turn supplies a stop signal SFO to the power device driving circuit C19 and the input circuit C11 so that the power device driving circuits C18 and C19 stop operation of the transistors 31 and 32 respectively. A resistor R6 is arranged between a wire connecting the current detection terminal CIN3 and the comparator C15 with each other and the ground potential.

The stop signal SFO for the power device driving circuit C18 is supplied through the input circuit C11 to the level shifting circuit C12, which in turn shifts the level of the stop signal SFO and supplies the level-shifted signal to the power device driving circuit C18 as a stop signal SFO1.

It can be said that the fault circuit C10, capable of outputting the stop signal SFO created by the same through the fault terminal $F_O$ and also receiving a stop signal SFO output from another control circuit and supplying the same to the power device driving circuit C19 and the input circuit C11, has an input/output function.

In structure, the fault circuit C10 may have a stop signal generation circuit C101 generating the stop signal SFO on the basis of the current abnormality signal supplied through a NOR circuit C16, a buffer circuit C102 employed for outputting the stop signal SFO to the exterior and a buffer circuit C103 employed for receiving the stop signal SFO output from the other control circuit as shown in FIG. 2, for example.

The stop signal SFO is output also to the exterior of the module 100 through the fault terminal FO thereof, to be employed also as a fault signal (error signal) for posting occurrence of an error such as shorting across the terminals P and N to the exterior of the module 100.

The current abnormality signal of the comparator C15 is supplied to the fault circuit C10 not directly but through the two-input NOR circuit C16.

The NOR circuit C16 also receives an output of a UV detection circuit C14. The UV detection circuit C14 detecting abnormal reduction of the driving voltage VCC outputs a prescribed signal (voltage reduction signal) when the driving voltage VCC falls below a prescribed value. This signal is supplied to the NOR circuit C16. The UV detection circuit C14 is referred to also as a voltage reduction protective circuit.

When at least either the UV detection circuit C14 or the comparator C15 outputs a signal indicating abnormality, the NOR circuit C16 outputs a signal for activating the fault circuit C10.

If the value of the driving voltage VCC serving also as the gate-to-emitter voltage of the low-potential side transistor 32, i.e. also as a control voltage, is abnormally reduced, the saturation voltage of the transistor 32 as well as power loss are increased to result in thermal breakage. Therefore, the operation of the transistor 32 must be stopped when the driving voltage VCC is reduced.

The power device driving circuit C18 stores a UV detection circuit C20 detecting abnormal reduction of the driving voltage VB, so that the operation of the transistor 31 can be stopped when the driving voltage VB falls below a prescribed value.

Figure 3:
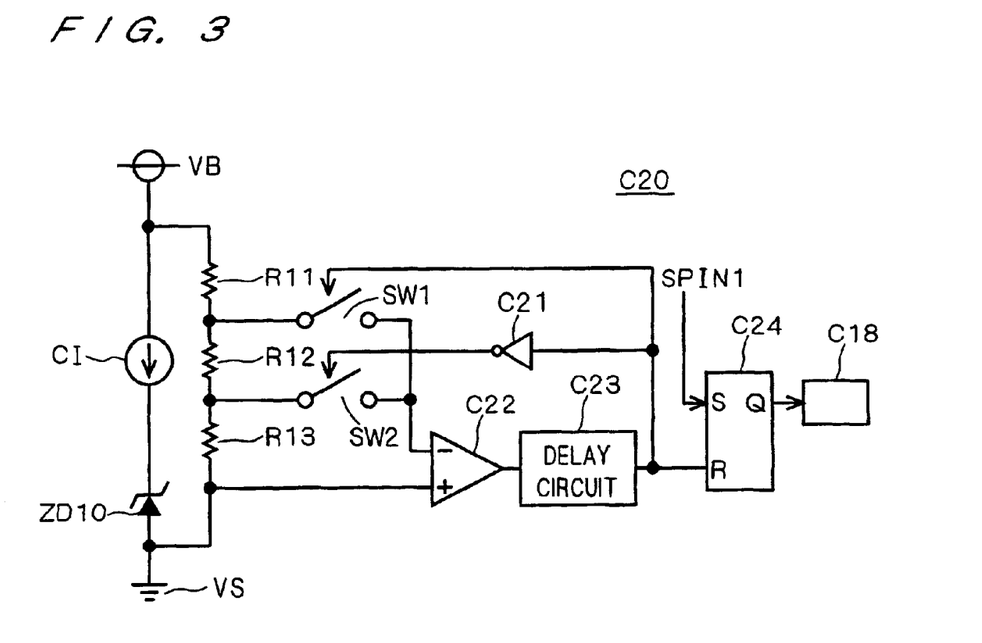
FIG. 3 illustrates the structure of a UV detection circuit of a high-potential side transistor.
Figure 4:
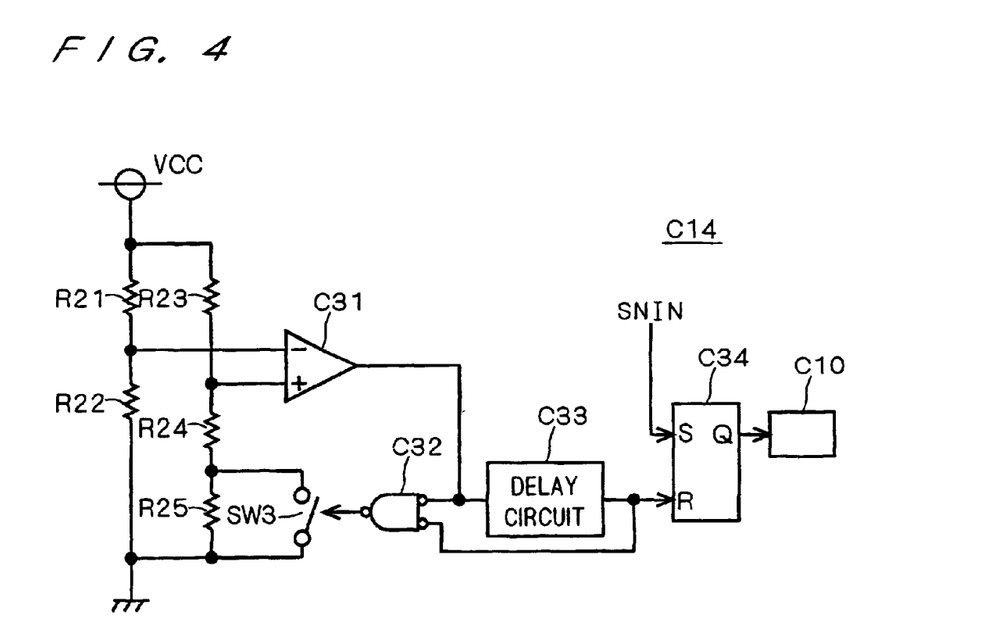
FIG. 4 illustrates the structure of a UV detection circuit of a low-potential side transistor.

FIGS. 3 and 4 show the structures of the UV detection circuits C20 and C14 respectively.

The UV detection circuit C20 shown in FIG. 3 comprises a constant current source CI arranged between the driving voltage VB and the standard potential VS, a Zener diode ZD10 having a cathode and an anode connected to the constant current source CI and the standard potential VS respectively, and resistors R11, R12 and R13 serially connected between the driving voltage VB and the standard potential VS.

The UV detection circuit C20 further comprises a comparator C22 comparing the driving voltage VB with the reference voltage REF generated on the basis of the Zener voltage of the Zener diode ZD10, a delay circuit C23 connected to an output of the comparator C22, an RS latch circuit C24 receiving the output of the delay circuit C23 in an R input while receiving the level-shifted control signal SPIN1 in an S input, switching means SW1 connecting and disconnecting the node between the resistors R11 and R12 and a minus terminal of the comparator C22 with and from each other in response to the output of the delay circuit C23, a switching element SW2 connecting and disconnecting the node between the resistors R12 and R13 and the minus terminal of the comparator C22 with and from each other and an inverter circuit C21 inverting the output of the delay circuit C23 and supplying the inverted output to the switching element SW2.

The UV detection circuit C20 having the aforementioned structure can set a voltage level (set level) for outputting the voltage reduction signal upon reduction of the driving voltage VB and a voltage level (reset level) for resetting upon recovery of the driving voltage VB. The set level is set lower than the reset level.

The delay circuit C23 is formed to set a filtering time and output the voltage reduction signal when the period of reduction of the driving voltage VB exceeds a prescribed time to be capable of preventing excessive protective operation in reaction to instantaneous reduction of the driving voltage VB or the like.

A Q output of the RS latch circuit C24 is supplied to the power device driving circuit C18 as the voltage reduction signal.

In the UV detection circuit C14 shown in FIG. 4, resistors R21 and R22 are serially arranged between the driving voltage VCC and the ground potential while resistors R23, R24 and R25 are serially arranged between the internal voltage VREG generated by the internal power source C13 (FIG. 2), for example, and the ground potential for generating the reference voltage by resistive division.

A comparator C31 has a minus terminal connected to the node between the resistors R21 and R22, a plus terminal connected to the node between the resistors R23 and R24 and an output connected to one input of an AND circuit C32 and an input of a delay circuit C33.

An output of the delay circuit C33 is connected to another input of the AND circuit C32, whose output is supplied to switch-control switching means SW3 provided on a path bypassing the resistor R25.

The output of the delay circuit C33 is supplied to an R input of an RS latch circuit C34, which has an S input supplied with the control signal SNIN and a Q output supplied to the fault circuit C10 as the voltage reduction signal.

The UV detection circuit C14 having the aforementioned structure, operating similarly to the UV detection circuit C20, can also set a voltage level (set level) for outputting the voltage reduction signal upon reduction of the driving voltage VCC and a voltage level (reset level) for resetting upon recovery of the driving voltage VCC. The set level is set lower than the reset level.

The delay circuit C33 is formed to set a filtering time and output the voltage reduction signal when the period of reduction of the driving voltage VCC exceeds a prescribed time to be capable of preventing excessive protective operation in reaction to instantaneous reduction of the driving voltage VCC or the like.

<A-2. Operation>

The control circuits IC11 and IC12 are identical in structure to the aforementioned control circuit IC13. The fault terminals $F_O$ of the control circuits IC11 to IC13 are connected with each other in the module 100 and only the control circuit IC13 detects the voltage value of the shunt resistor R20 in the module 100 as shown in FIG. 1. When an abnormal current flows across the terminals P and N, therefore, the fault terminal $F_O$ of the control circuit IC13 outputs the stop signal SFO, which in turn is input in the fault terminals $F_O$ of the control circuits IC11 and IC12.

Consequently, the control circuits IC11 and IC12 can stop the transistors 11 and 12 and the transistors 21 and 22 respectively simultaneously with the control circuit IC13 stopping the transistors 31 and 32.

In the conventional module 90 described with reference to FIG. 8, the current detection terminals CIN1, CIN2 and CIN3 of the control circuits IC1 to IC3 detect the voltage of the shunt resistor R20 and the control circuits IC1 to IC3 individually stop the control signals to the transistors 11, 12, 21, 22, 31 and 32 when the current of the power source PS is abnormal, and hence times required for stopping the transistors 11, 12, 21, 22, 31 and 32 may be dispersed if the comparators C1 (FIG. 9) provided in the control circuits IC1 to IC3 are dispersed in characteristics or reference voltage. On the other hand, the control circuits IC11 and IC12 according to this embodiment stop the transistors 11 and 12 and the transistors 21 and 22 respectively with the stop signal SFO output from the control circuit IC13 without using the comparators C15, whereby the transistors 11, 12, 21 and 22 can be stopped at the same timing.

This is enabled by the input/output function of the fault circuits C10 of the control circuits IC11 to IC13, which can not only output but also receive the stop signal SFO.

Figure 5:
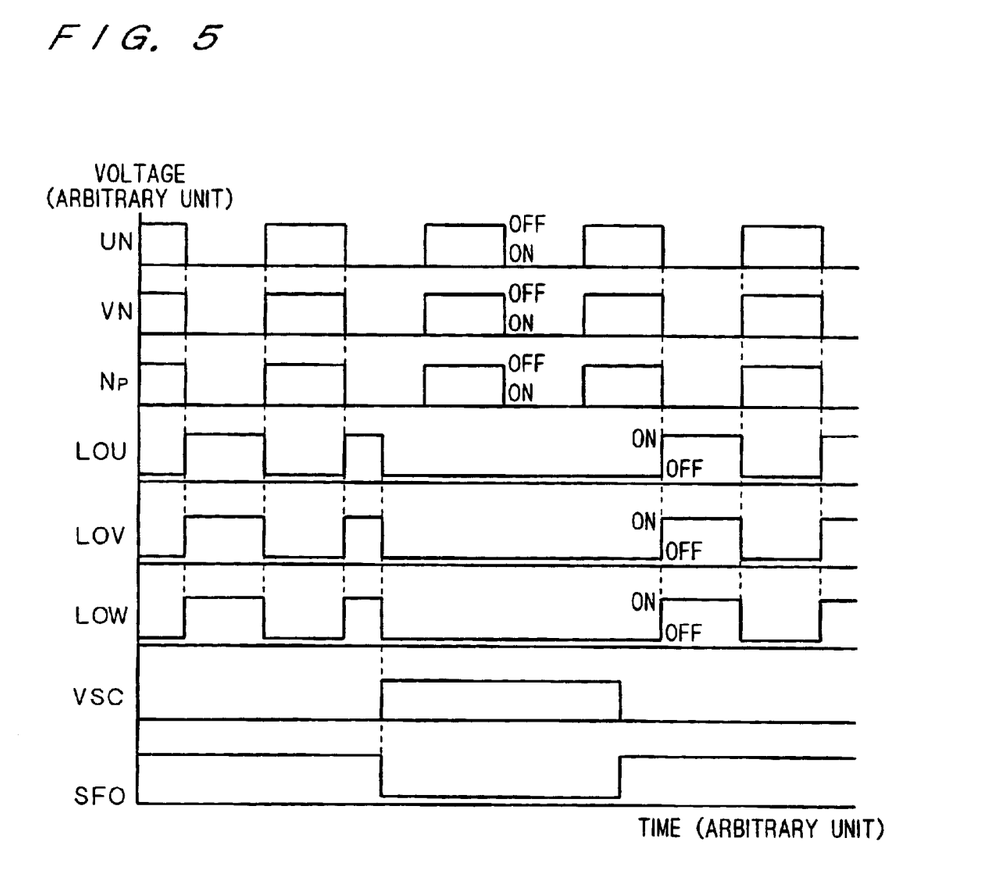
FIG. 5 is a timing chart showing operation of the semiconductor device according to the embodiment 1 of the present invention.

FIG. 5 is a timing chart of operation stoppage of the transistors 12, 22 and 32 upon current abnormality of the power source PS.

Referring to FIG. 5, the horizontal axis shows the time (arbitrary unit) and the vertical axis shows the voltage (arbitrary unit). FIG. 5 further shows control signals UN, VN and WN for the low-potential side transistors 12, 22 and 32 supplied from the control signal input terminals $U_N$, $V_N$ and $W_N$ respectively, control signals LOU, LOV and LOW supplied from the control circuits IC11 to IC13 to the low-potential side transistors 12, 22 and 32 respectively, the detected voltage VSC of the shunt resistor R20 and the stop signal SFO.

As shown in FIG. 5, the control signals UN, VN and WN are so pulsatively supplied that the leading and trailing edges, i.e. ON and OFF times match with each other, and the control signals LOU, LOV and LOW are pulsatively supplied on the leading and trailing edges of the control signals UN, VN and WN.

The leading and trailing edges of the control signals UN, VN and WN and the control signals LOU, LOV and LOW are reversal to each other.

As shown in FIG. 5, the stop signal SFO is kept at a prescribed level when the detected voltage VSC is 0 V, i.e. when normal operation is made, while the control signals LOU, LOV and LOW are not output but the transistors 12, 22 and 32 are kept in stop states until the detected voltage VSC returns to 0 V when the detected voltage VSC is increased due to abnormality such as shorting across the terminals P and N.

<A-3. Function/Effect>

As hereinabove described, the control circuits IC11 and IC12 can stop the transistors 11 and 12 and the transistors 21 and 22 respectively simultaneously with the control circuit IC13 stopping the transistors 31 and 32 so that the transistors 11, 12, 21, 22, 31 and 32 can be stopped at the same timing in the inverter module 100 according to the embodiment 1. Thus, protective operation can be matched between U, V and W phases, and the inverter module 100 can be improved in reliability.

Only internal wires connecting the fault terminals $F_O$ of the control circuits IC11 to IC13 with each other are required therefor and hence the module 100 can be miniaturized by reducing the number of internal wires.

Also when the UV detection circuit C14 detects abnormal reduction of the driving voltage VCC, the fault circuit C10 can be activated to output the stop signal SFO, whereby the transistors 11, 12, 21, 22, 31 and 32 can be stopped at the same timing also in abnormal reduction of the driving voltage VCC.

<B. Embodiment 2>

<B-1. Device Structure>

Figure 6:
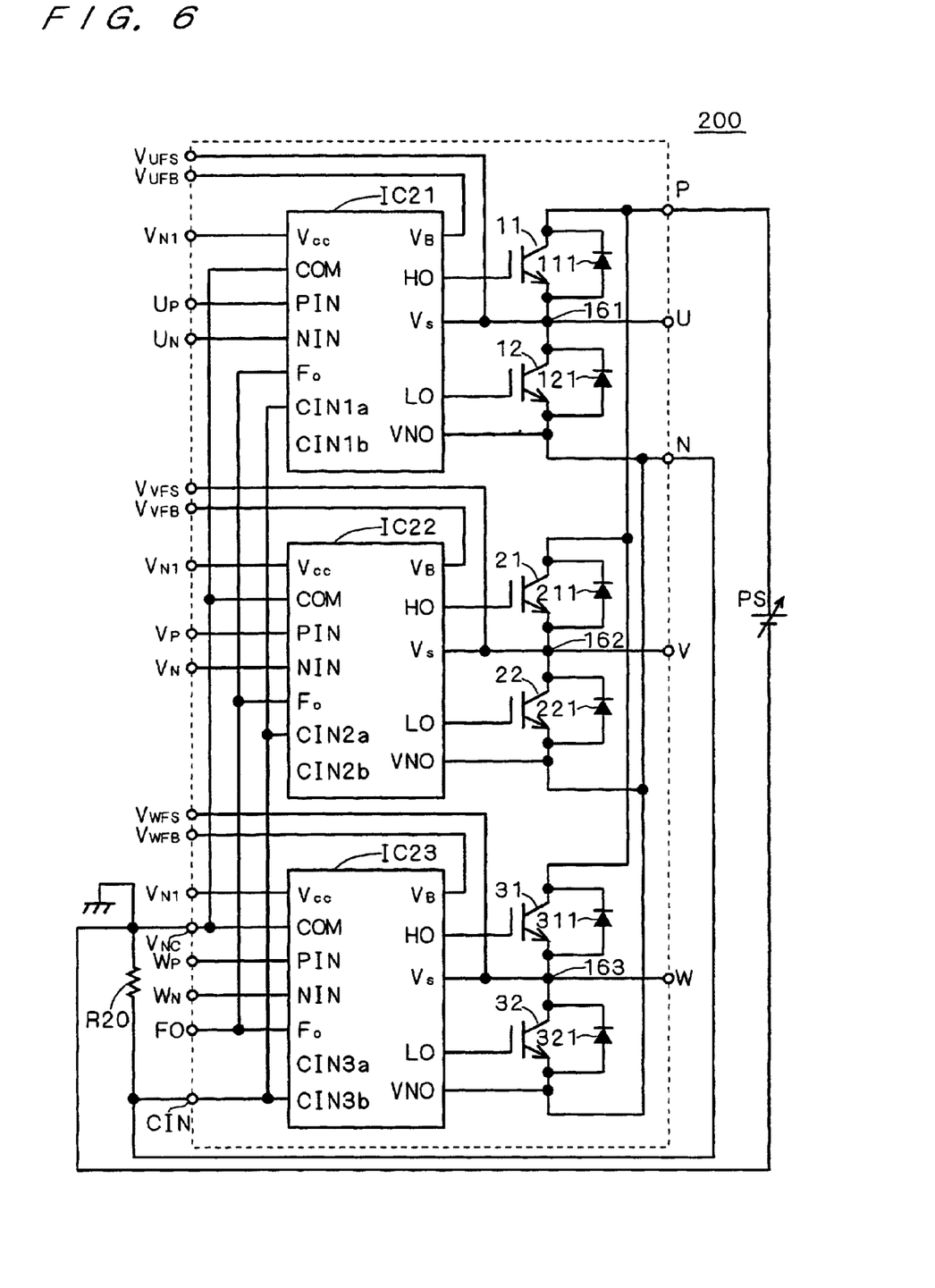
FIG. 6 illustrates the structure of a semiconductor device according to an embodiment 2 of the present invention.

FIG. 6 is a block diagram showing the structure of an inverter module 200 having a three-phase bridge circuit according to an embodiment 2 of the present invention. Referring to FIG. 6, packaged control circuits IC21, IC22 and IC23 are arranged for controlling sets of transistors 11 and 12, transistors 21 and 22 and transistors 31 and 32 respectively. The remaining parts of the inverter module 200 identical to those of the inverter module 100 described with reference to FIG. 1 are denoted by the same reference numerals, to omit redundant description.

As shown in FIG. 6, the control circuits IC21 to IC23 have current detection terminals CIN1*a* and CIN1*b*, current detection terminals CIN2*a* and CIN2*b* and current detection terminals CIN3*a* and CIN3*b* for detecting different voltages respectively. The current detection terminals CIN1*a*, CIN2*a* and CIN3*b* are connected to a current detection terminal CIN of the module 200 in common while the current detection terminals CIN1*b*, CIN2*b* and CIN3*a* are connected to no terminals.

The current detection terminals CIN1*a*, CIN1*b*, CIN2*a*, CIN2*b*, CIN3*a* and CIN3*b* detect voltages in the relation of CIN1*a*=CIN2*a*=CIN3*a*>CIN1*b*=CIN2*b*=CIN3*b*.

In other words, the current detection terminal CIN1*a* is higher in sensitivity than the current detection terminal CIN1*b*, the current detection terminal CIN2*b* is higher in sensitivity than the current detection terminal CIN2*a*, and the current detection terminal CIN3*b* is higher in sensitivity than the current detection terminal CIN3*a*.

Figure 7:
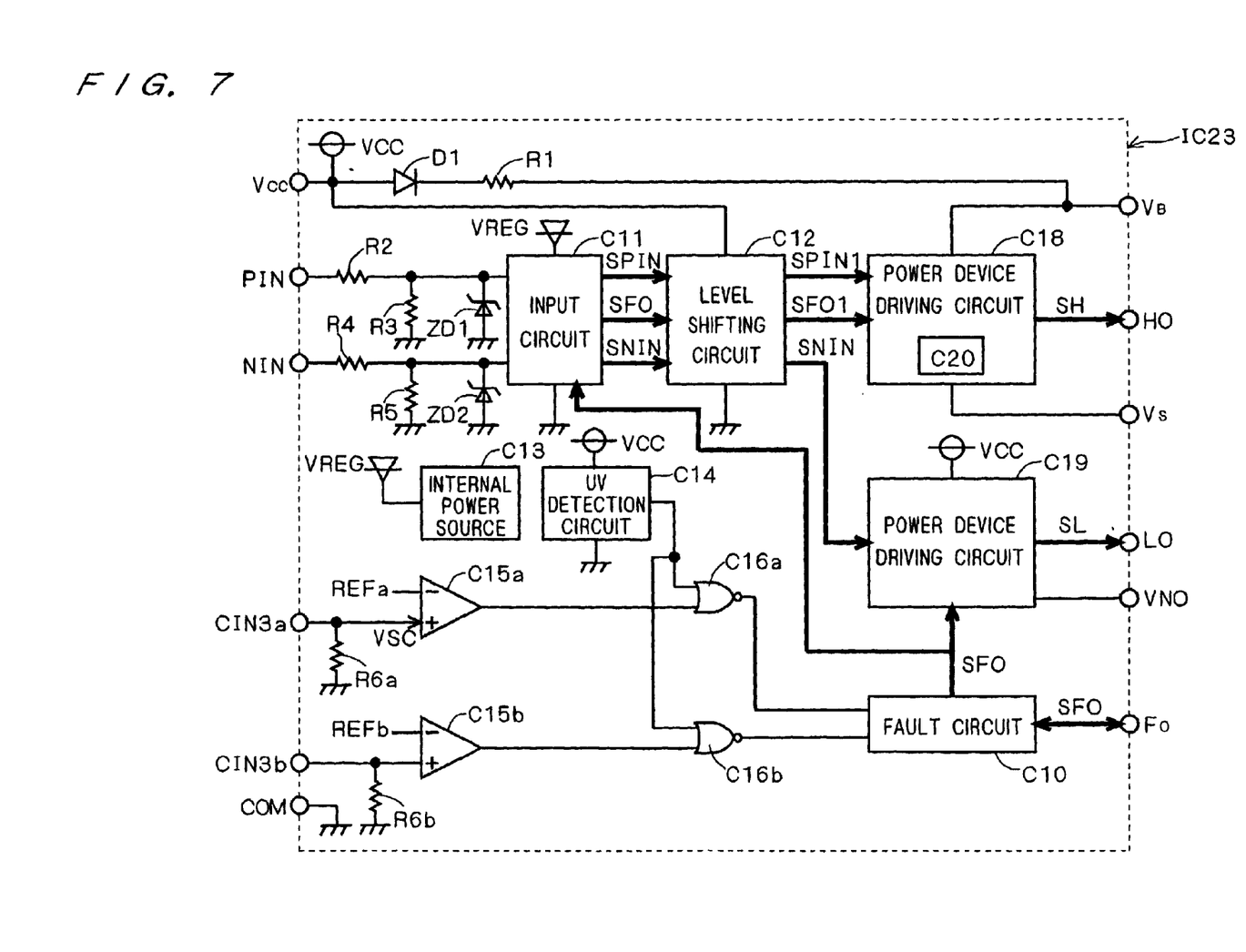
FIG. 7 illustrates the structure of a control circuit of the semiconductor device according to the embodiment 2 of the present invention.

Referring to FIG. 7, the internal structure of each of the control circuits IC21 to IC23 is now described with reference to the control circuit IC23.

The control circuit IC23 is basically identical to the control circuit IC13 described with reference to FIG. 2, and parts of the control circuit IC23 identical to those of the control circuit IC13 are denoted by the same reference numerals, to omit redundant description.

When the current detection terminal CIN3a detects the voltage VSC of a shunt resistor R20 in FIG. 7, the detected voltage VSC is input in a comparator C15a, which in turn compares the voltage VSC with a reference voltage REFa.

When the current detection terminal CIN3b detects the voltage VSC of the shunt resistor R20, the detected voltage VSC is input in a comparator C15b, which in turn compares the voltage VSC with a reference voltage REFb.

Outputs of the comparators C15a and C15b are supplied to a fault circuit C10 through two-input NOR circuits C16a and C16b respectively. The NOR circuits C16a and C16b also receive an output of a UV detection circuit C14.

A resistor R6a is arranged between a wire connecting the current detection terminal CIN3a and the comparator C15a with each other and a ground potential, while a resistor R6b is arranged between a wire connecting the current detection terminal CIN3b and the comparator C15b with each other and the ground potential.

Based on the aforementioned relation between the detected voltages, the reference voltage REFb is lower than the reference voltage REFa, as a matter of course.

Thus, the current detection terminals CIN3a and CIN3b are connected to the comparators C15a and C15b respectively, whereby the detected voltages, i.e., the levels of detection sensitivity can be rendered different by setting the reference voltages REFa and REFb to different values in the comparators C15a and C15b.

<B-2. Operation>

Referring to FIG. 7, the current detection terminals CIN1a, CIN2a and CIN3b are connected to a current detection terminal CIN of the module 200 in common, and hence it follows that the respective ones of the control circuits IC21 to IC23 detect the voltage of the shut resistor R20 upon occurrence of abnormality, while the control circuit IC23 having the current detection terminal CIN3b connected to the current detection terminal CIN of the module 200 detects voltage abnormality first, and transistors 11, 12, 21, 22, 31 and 32 can be simultaneously stopped with a stop signal SFO output from the control circuit IC23.

When the difference between the reference voltages REFa and REFb is rendered larger than dispersion of the reference voltages or dispersion of the performance of the comparators C15a and C15b between the control circuits IC21 to IC23, it is possible to prevent the remaining control circuits IC21 and IC22 from detecting voltage abnormality in advance of the control circuit IC23, thereby reliably preventing displacement in timing for stopping the transistors 11, 12, 21, 22, 31 and 32.

<B-3. Function/Effect>

In the inverter module 200 according to the embodiment 2, as hereinabove described, the control circuits IC21 and IC22 can stop the transistors 11 and 12 and the transistors 21 and 22 respectively simultaneously with the control circuit IC23 stopping the transistors 31 and 32, whereby the transistors 11, 12, 21, 22, 31 and 32 can be stopped at the same timing. Thus, protective operation can be matched between U, V and W phases, and the inverter module 200 can be improved in reliability.

While the invention has been shown and described in detail, the foregoing description is in all aspects illustrative and not restrictive. It is therefore understood that numerous modifications and variations can be devised without departing from the scope of the invention.

What is claimed is:

1. A semiconductor device comprising:
    a plurality of sets of complementarily operating first and second switching elements serially interposed between first and second main power supply terminals supplied with a dc voltage;
    a plurality of control circuits driving/controlling said plurality of sets of first and second switching elements respectively; and
    a shunt resistor detecting a current flowing across said first and second main power supply terminals, wherein
    each of said plurality of control circuits comprises:
    at least one current detection circuit detecting a voltage generated by a current flowing to said shunt resistor and outputting a current abnormality signal indicating current abnormality when detected said voltage is in excess of a prescribed level, and
    a fault circuit receiving said current abnormality signal output from said at least one current detection circuit and outputting a stop signal for stopping operation of at least one of said first and second switching elements, corresponding to said current abnormality, and
    said fault circuit has a function of outputting said stop signal to a different control circuit other than said control circuit to which itself belongs while stopping operation of at least one of said first and second switching elements which is controlled by said control circuit to which itself belongs also by said stop signal input from said different control circuit.

2. The semiconductor device according to claim 1, wherein
    said at least one current detection circuit includes first and second current detection circuits, and
    said first current detection circuit is set lower in detected voltage than said second current detection circuit.

3. The semiconductor device according to claim 2, wherein
    only one of said plurality of control circuits detects said voltage of said shunt resistor by said first current detection circuit while remaining said control circuit is electrically connected to said shunt resistor to detect said voltage of said shunt resistor by said second current detection circuit.

4. The semiconductor device according to claim 1, wherein
    only one of said plurality of control circuits detects said voltage of said shunt resistor, outputs said stop signal and supplies the same to said fault circuit of remaining said control circuit.

5. The semiconductor device according to claim 1, wherein
    said at least one control circuit further comprises:
    a voltage detection circuit detecting a driving voltage supplied to said at least one control circuit and outputting a voltage reduction signal indicating voltage reduction when said driving voltage is below a prescribed level, and
    said fault circuit outputs said stop signal when at least one of said voltage reduction signal and said current abnormality signal is output.

6. The semiconductor device according to claim 5, wherein
said driving voltage is supplied to a control electrode of a low-potential side of said at least one set of first and second switching elements also as a control voltage.

7. The semiconductor device according to claim 5, wherein
said at least one current detection circuit includes first and second current detection circuits, and
said first current detection circuit is set lower in detected voltage than said second current detection circuit.

8. The semiconductor device according to claim 7, wherein
only one of said plurality of control circuits detects said voltage of said shunt resistor by said first current detection circuit while remaining said control circuit is electrically connected to said shunt resistor to detect said voltage of said shunt resistor by said second current detection circuit.

9. The semiconductor device according to claim 5, wherein
only one of said plurality of control circuits detects said voltage of said shunt resistor, outputs said stop signal and supplies the same to said fault circuit of remaining said control circuit.

* * * * *